(12) United States Patent
Akaike et al.

(10) Patent No.: US 12,447,445 B2
(45) Date of Patent: Oct. 21, 2025

(54) POROUS SEPARATION MEMBRANE

(71) Applicant: TORAY INDUSTRIES, INC., Tokyo (JP)

(72) Inventors: Kaori Akaike, Tokyo (JP); Akihiro Hayashi, Otsu (JP); Hirokazu Sakaguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 591 days.

(21) Appl. No.: 17/777,725

(22) PCT Filed: Nov. 19, 2020

(86) PCT No.: PCT/JP2020/043182
§ 371 (c)(1),
(2) Date: May 18, 2022

(87) PCT Pub. No.: WO2021/100804
PCT Pub. Date: May 27, 2021

(65) Prior Publication Data
US 2023/0024252 A1 Jan. 26, 2023

(30) Foreign Application Priority Data
Nov. 21, 2019 (JP) ................. 2019-210190

(51) Int. Cl.
*B01D 71/68* (2006.01)
*B01D 67/00* (2006.01)
(Continued)

(52) U.S. Cl.
CPC ......... *B01D 71/68* (2013.01); *B01D 67/0088* (2013.01); *B01D 69/02* (2013.01);
(Continued)

(58) Field of Classification Search
CPC ........ B01D 71/82; B01D 67/00; B01D 71/68; B01D 69/02; B01D 71/38; B01D 71/44; B01D 69/08; A61M 1/16
See application file for complete search history.

(56) References Cited

U.S. PATENT DOCUMENTS
2020/0215239 A1  7/2020  Ushiro et al.

FOREIGN PATENT DOCUMENTS
| | | | |
|---|---|---|---|
| JP | 2010104984 A | * | 5/2010 |
| JP | 2014073487 A | * | 4/2014 |
| WO | WO 2018/025772 A1 | | 2/2018 |

OTHER PUBLICATIONS
JP_2014073487_A_translation (Year: 2014).*
(Continued)

*Primary Examiner* — Kara M Peo
(74) *Attorney, Agent, or Firm* — Birch, Stewart, Kolasch & Birch, LLP

(57) ABSTRACT

The present invention aims to provide a porous separation membrane that does not suffer a significant decrease in the protein permeability even after long term use. The porous separation membrane has an asymmetric structure with a dense layer forming one surface layer and with a coarse layer forming the other surface layer, supports a biocompatible polymer, and meet the requirements (1) and (2) given below in surface analysis of a cross section containing the dense layer and the coarse layer performed by TOF-SIMS:
(1) the minimum value of normalized intensity of the ion signal attributed to the biocompatible polymer in the coarse layer is 0.15 times or more of the maximum value, and
(2) the normalized average intensity of the ion signal attributed to the biocompatible polymer in the dense
(Continued)

inner surface side | outer surface side layer is 2.0 times or more of the normalized average intensity of the ion signal attributed to carboxylic acid in the coarse layer.

9 Claims, 1 Drawing Sheet

(51) Int. Cl.
    *B01D 69/02*     (2006.01)
    *B01D 69/08*     (2006.01)
    *B01D 71/38*     (2006.01)
    *B01D 71/44*     (2006.01)
    *B01D 71/82*     (2006.01)

(52) U.S. Cl.
    CPC ........... *B01D 69/08* (2013.01); *B01D 71/381* (2022.08); *B01D 71/441* (2022.08); *B01D 71/82* (2013.01); *B01D 2323/02* (2013.01); *B01D 2323/04* (2013.01); *B01D 2323/18* (2013.01); *B01D 2325/022* (2013.01); *B01D 2325/34* (2013.01); *B01D 2325/58* (2022.08)

(56) References Cited

OTHER PUBLICATIONS

JP2010104984A-translation (Year: 2010).*
International Search Report, issued in PCT/JP2020/043182, PCT/ISA/210, dated Jan. 12, 2021.
Written Opinion of the International Searching Authority, issued in PCT/JP2020/043182, PCT/ISA/237, dated Jan. 12, 2021.

* cited by examiner

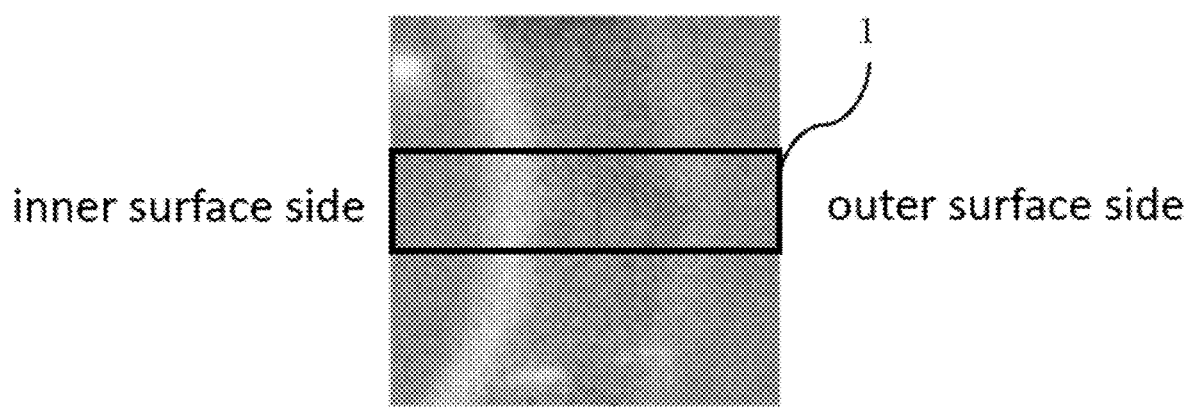

POROUS SEPARATION MEMBRANE

TECHNICAL FIELD

The present invention relates to a porous separation membrane.

BACKGROUND ART

Porous separation membranes are suitable for membrane separation that is intended to sift substances in liquid according to pore size and have been used suitably in, for example, medical applications such as hemodialysis, blood filtration, and plasma separation and water treatment applications such as household water purifiers and other water purification instruments. In recent years, furthermore some biopharmaceuticals, particularly antibodies such as immunoglobulins, have come in wide use due to their useful therapeutic effects and few side effects. Since antibodies are produced by organisms such as animal cells, it is necessary to separate antibodies alone from various impurities and purify them in order to allow them to be used as pharmaceuticals, and porous separation membranes have been generally used for their separation and purification.

For the removal of viruses, in particular, it is effective to use a separation membrane to carry out membrane filtration so that they are separated by its sifting function because it has little influence on active components such as antibodies and can serve to remove chemically resistant viruses. Such a separation membrane for virus removal is required not only to show high separation performance and work without leakage of viruses, but also to realize a high recovery rate by efficiently letting pass and recovering proteins such as antibodies that are active components.

Examples of such membranes for virus removal proposed so far include a porous hollow fiber membrane designed for removing viruses that consists mainly of two components, namely, a polysulfone based polymer and a copolymer of vinylpyrrolidone and vinyl acetate, has an inner diameter of 150 µm or more and 300 µm or less and a membrane thickness of more than 50 µm and 80 µm or less, and has an asymmetric structure containing a dense layer as a surface layer (see, for example, Patent document 1). However, although the adsorption of proteins to the dense layer should be suppressed in order to prevent clogging from being caused by proteins adsorbed on the porous hollow fiber membrane, this problem cannot be solved by the technique proposed in Patent document 1. There are some solutions proposed to this including a porous hollow fiber filtration membrane that contains a polysulfone based polymer and a hydrophilic polymer, has an inclined asymmetric structure in which the average pore diameter increases from the outer surface toward the inner surface, has a hydrophilic polymer content of 6.0 to 12.0 mass % in the membrane, and has a ratio of 1.20 to 1.60 between the hydrophilic polymer content in the outer surface layer and the hydrophilic polymer content inside the membrane (see, for example, Patent document 2). Also included is a separation membrane that is made of a polymer and has the following features: it has a functional layer at one surface of the membrane; observation of the surface of the functional layer by X-ray photoelectron spectroscopy (XPS) shows that ester group-derived carbon atoms give a peak area percentage of 0.1 (atom count percentage) or more and 10 (atom count percentage) or less; and observation of the opposite surface to the one having a functional layer by X-ray photoelectron spectroscopy (XPS) shows that ester group-derived carbon atoms give a peak area percentage of 10 (atom count percentage) or less (see, for example, Patent document 3).

PRIOR ART DOCUMENTS

Patent Documents

Patent document 1: International Publication WO 2013/012024
Patent document 2: International Publication WO 2016/117565
Patent document 3: International Publication WO 2009/123088

SUMMARY OF INVENTION

Problems to be Solved by the Invention

However, since the porous hollow fiber filtration membrane disclosed in Patent document 2 is produced from a spinning dope solution that contains a polysulfone based polymer, a hydrophilic polymer, and a solvent, the hydrophilic polymer on the surface of the dense layer is still insufficient, and therefore, further suppression of the adsorption of proteins on the dense layer is required now. The separation membrane disclosed in Patent document 3, furthermore, is characterized by localizing ester groups on the surface of the functional layer for the purpose of suppressing the adhesion of proteins, but the adsorption of proteins in regions other than the surface of the functional layer, such as support layer, is not suppressed sufficiently. In view of these problems with the conventional techniques, the main object of the present invention is to provide a porous separation membrane characterized in that the adsorption of proteins is suppressed inside the separation membrane and that only a small decrease in the protein permeability occurs even after long term use.

Means of Solving the Problems

In order to solve the above problems, the present invention provides a porous separation membrane having an asymmetric structure in which one surface has a dense layer while the other surface has a coarse layer and supports a biocompatible polymer and meeting the requirements (1) and (2) given below in surface analysis of a cross section containing the dense layer and the coarse layer performed by TOF-SIMS:
(1) The minimum value of normalized intensity of the ion signal attributed to the biocompatible polymer in the coarse layer is 0.15 times or more of the maximum value.
(2) The normalized average intensity of the ion signal attributed to the biocompatible polymer in the dense layer is 2.1 times or more of that in the coarse layer.

Advantageous Effects of the Invention

The porous separation membrane according to the present invention can maintain protein permeability even after long term use as a result of suppressing the adhesion of proteins inside the separation membrane.

BRIEF DESCRIPTION OF THE DRAWINGS

FIG. 1 This is an example of an overall secondary ion image obtained by TOF-SIMS observation of a cross section of the porous separation membrane according to the present invention.

DESCRIPTION OF PREFERRED EMBODIMENTS

The invention is described in more detail below. In the present Description, when a range is defined by two values with a "to" in between, the range is inclusive of the values.

The porous separation membrane according to the present invention (hereinafter, occasionally referred to simply as separation membrane, and for convenience of explanation, a membrane not having a supported biocompatible polymer as described later will be also occasionally referred to simply as separation membrane) has an asymmetric structure in which one surface has a dense layer and the other surface has a coarse layer. In other words, it has a structure in which the pore diameter near one surface is smaller and the pore diameter near the other surface is larger. Here, for the present invention, the dense layer refers to a layer having a small pore diameter and existing near the surface where the pore diameter is smaller while the coarse layer refers to a layer other than the dense layer. Because of having such an asymmetric structure, there are a region having a small pore diameter to contribute to the separation of the substances to be removed and a region having a large pore diameter that is low in water permeation resistance, making it easy to achieve both high separation performance and water permeability. In the case of a hollow fiber membrane, for example, either the inner surface may have a dense layer or the outer surface may have a dense layer, but it is preferable for the inner surface to have a dense layer from the viewpoint of easy adjustment of the pore size in the dense layer.

In the separation membrane of the present invention, substances are separated mainly in the dense layer, but the dense layer tends to have a large resistance to the permeation of process liquids such as water. For the present invention, it is preferable for a separation membrane used for separating proteins and viruses in particular to have a dense layer that is free of pores with pore diameters of 130 nm or more. In the case where the dense layer is a layer satisfying the above requirement, the thickness of the dense layer is preferably 10 µm or less and more preferably 5.0 µm or less, from the viewpoint of ensuring high permeability. On the other hand, from the viewpoint of improving the separation performance, the thickness of the dense layer is preferably 0.05 µm or more and more preferably 0.1 µm or more.

Here, for the present invention, the thickness of a dense layer in an embodiment that satisfies the above requirement is determined by observing a cross section of the separation membrane, for example a cross section perpendicular to the axial direction of a hollow fiber membrane, using a scanning electron microscope (SEM) at a magnification of 10,000 times and analyzing the photographed image using image processing software. Specifically, the photographed image is first binarized by setting a threshold value so that structure portions have high brightness while the other portions have low brightness. Then, in the separation membrane, which is assumed to contain pores having a perfect circular shape, the region free of low brightness portions having an area of $1.3 \times 10^4$ ($nm^2$) or more, that is, having a pore diameter of 130 nm, is identified as dense layer, and the average thickness of the dense layer across the cross section is determined. More specifically, it is determined by the method (1) described in section EXAMPLES described later. However, if the structure portions and the other portions cannot be distinguished from each other based on differences in contrast in the image, the image analysis may be performed after covering the portions other than the structure portions with a black paint. As a method for eliminating noise, the noise portions may be painted white.

From the viewpoint of reducing the permeation resistance and improving the permeability, the separation membrane according to the present invention preferably has such a structure in which the pore diameter gradually increases from the dense layer side toward the coarse layer side. Furthermore, from the viewpoint of the strength of the separation membrane, it is preferable for the coarse layer to be free of observable macrovoids, that is, void regions in which membrane material is missing in elliptical or drop shapes.

The separation membrane according to the present invention has a biocompatible polymer (hereinafter occasionally referred to as coating polymer) supported thereon. The existence of a coating polymer supported thereon serves to suppress the adsorption of proteins and improve the protein permeability.

A biocompatible polymer means a polymer that can act to suppress the adhesion of bio-derived components, proteins in particular, that are contained in blood, plasma, urine, and the like. Although not particularly limited, good examples thereof include hydrophilic polymers such as polyethylene glycol, polyethylene imine, polyvinyl alcohol, and polyvinylpyrrolidone, and derivatives thereof; 2-methacryloyloxyethyl phosphorylcholine (MPC) and derivatives thereof; 2-methoxyethyl acrylate (PMEA) and derivatives thereof; and polymers containing monocarboxylic acid vinyl ester units, which will be described later.

A monocarboxylic acid means a compound containing one carboxy group and a hydrocarbon group bonded to the carbon atom in the carboxy group, that is, a compound represented as R—COOH (R is a hydrocarbon group). The hydrocarbon group R may be either an aliphatic hydrocarbon group or an aromatic hydrocarbon group, but it is preferably an aliphatic hydrocarbon group and more preferably a saturated aliphatic hydrocarbon group from the viewpoint of the easiness of synthesis. Examples of the saturated aliphatic hydrocarbon group include those having a linear structure such as ethyl group, n-propyl group, n-butyl group, n-pentyl group, and n-hexyl group, those having a branched structure such as isopropyl group and tertiary butyl group, and those having a cyclic structure such as cyclopropyl group and cyclobutyl group. In addition, such an aliphatic chain may contain an ether bond, an ester bond, or the like. In particular, such a saturated aliphatic hydrocarbon group preferably has a linear structure or a branched structure, of which a linear structure is preferred, from the viewpoint of the cost for producing the carboxylic acid.

Monocarboxylic acids in which the hydrocarbon group R is an aromatic hydrocarbon group include, for example, benzoic acid and derivatives thereof. On the other hand, monocarboxylic acids in which the hydrocarbon group R is a saturated aliphatic hydrocarbon group include, for example, acetic acid, propanoic acid, and butyric acid.

Here, in the hydrocarbon group R, at least some of the hydrogen atoms may be substituted appropriately, but if the terminal hydrogen atom is substituted with an anionic functional group such as sulfonic acid group, it may work to make the protein structure unstable and induce its adhesion to the surface of the separation membrane, and therefore, it is preferable for the terminal hydrogen atom not to be substituted with an anionic functional group.

The number of carbon atoms in the hydrocarbon group R is preferably small in order to allow the monocarboxylic acid to be low in hydrophobicity, reduce its hydrophobic interaction with proteins, and prevent their adhesion. In the case where R is an aliphatic hydrocarbon group or an aromatic hydrocarbon group, therefore, the number of carbon atoms is preferably 20 or less, more preferably 9 or less, and still more preferably 5 or less. On the other hand, the number of carbon atoms is 1 or more, when R is an aliphatic hydrocarbon group or an aromatic hydrocarbon group, it is preferably 2 or more in order to ensure a high mobility of the monocarboxylic acid and prevent the adhesion of proteins. Here, in the case where R is a saturated aliphatic hydrocarbon group, the compound containing one carbon atom is acetic acid and the compound containing two carbon atoms is propanoic acid.

In the present Description, the term "unit" refers to a repeating unit existing in a homopolymer or copolymer that is produced through the polymerization of monomers, and the term "carboxylic acid vinyl ester unit" refers to a repeating unit that is produced through the polymerization of carboxylic acid vinyl ester monomers, that is, a repeating unit represented as —CH(OCO—R)—CH$_2$— (R is a hydrocarbon group). R is the same as described above in relation to monocarboxylic acid, and preferred examples thereof are also the same as described above.

Specific examples of the monocarboxylic acid vinyl ester unit in which the hydrocarbon group R is a saturated aliphatic group include vinyl propanoate unit, vinyl pivalate unit, vinyl decanoate unit, and vinyl methoxyacetate unit. Since moderate hydrophobicity is preferred, good examples include vinyl acetate unit (R: CH$_3$), vinyl propanoate unit (R: CH$_2$CH$_3$), vinyl butyrate unit (R: CH$_2$CH$_2$CH$_3$), vinyl pentanoate unit (R: CH$_2$CH$_2$CH$_2$CH$_3$), vinyl pivalate unit (R: C(CH$_3$)$_3$), and vinyl hexanoate unit (R: CH$_2$CH$_2$CH$_2$CH$_2$CH$_3$). Monocarboxylic acid vinyl ester units in which R is aromatic include, for example, vinyl benzoate unit and substitution products thereof.

Next, a method for examining whether a biocompatible polymer is supported appropriately on a separation membrane is described focusing on a case where the biocompatible polymer is a monocarboxylic acid vinyl ester unit. In the case where a polymer other than this is used as a biocompatible polymer, ion signals, for example, attributed to a unique molecular structure of the polymer are measured using TOF-SIMS in combination with other appropriate measuring methods.

If a polymer containing a monocarboxylic acid vinyl ester unit is supported, it can be confirmed by a combination of measurement by a TOF-SIMS instrument and measurement by an X-ray photoelectron spectrometer (XPS). Specifically, a peak attributed to the carboxylic acid ion of the saturated aliphatic monocarboxylic acid ester is detected first by measurement by a TOF-SIMS instrument, and the structure of the monocarboxylic acid can be determined by analyzing its mass (m/z).

In the measurement by a TOF-SIMS instrument, the surface of a sample placed in an ultra-high vacuum is irradiated with pulsed ions (primary ions), and the ions released from the sample surface (secondary ions) gain a certain amount of kinetic energy and is introduced into a time-of-flight mass spectrometer. After being accelerated by the same quantity of energy, the secondary ions fly at different speeds depending on their masses as they pass through the analyzer. Since the distance to the detector is constant, the time for them to reach there (time of flight) is represented as a function of mass. Accordingly, precise measurement of the time-of-flight distribution gives a mass distribution, i.e. a mass spectrum, of the secondary ions. For example, if Bi$_3^{++}$ is used as the primary ion species and the secondary positive ions are detected, a peak at m/z=43.01 corresponds to C$_2$H$_3$O$^+$, that is, acetic acid (an aliphatic chain containing one carbon atom). Furthermore, a peak at m/z=57.03 corresponds to C$_3$H$_5$O$^+$, that is, propanoic acid (an aliphatic chain containing two carbon atoms).

The ion signal measurement with a TOF-SIMS instrument is performed under the conditions given below. The measuring area is 100 μm×100 μm; the primary ion acceleration voltage is 30 kV; and the pulse width is 7.8 nS. When performing this analysis method, the detection depth is several nanometers or less. For this analysis, if the proportion of the intensity of the ion signal attributed to carboxylic acid to the total secondary ion intensity is 0.1% or less, the signal is regarded as noise and assumed to indicate that the carboxylic acid ion is not present. More specifically, it is determined by the method (2) specified in section EXAMPLES described later.

If XPS measurement is performed additionally, a carbon peak derived from an ester group (COO) appears at +4.0 to 4.2 eV from a main peak of CH$_x$ and C—C (around 285 eV), showing that the above carboxylic acid has an ester bond. In regard to the measuring angle for XPS, measurements taken at 90° are adopted. When measurement is performed at a measuring angle of 90°, the region down to a depth of about 10 nm from the surface is analyzed. The peak of carbon derived from an ester group (COO) can be determined by deconvoluting peaks appearing at +4.0 to 4.2 eV from a main peak derived from CH and C—C in the C1s spectrum. More specifically, the C1s peak is composed of five components: a component mainly derived from CH$_x$, C—C, C=O, and C—S, a component mainly derived from C—O and C—N, a component derived from π-π* satellite, a component derived from C=O, and a component derived from COO. The proportion of carbon atoms (atom count percentage) derived from the ester group can be determined by deconvoluting the peak into the above five components and calculating the ratio of the peak area derived from the ester group to the total peak area derived from carbon. In this measurement, if the proportion of the peak area derived from the ester group to the total peak area derived from carbon is 0.4% or less, it is regarded as noise and assumed to indicate that the ester group is not present. More specifically, it is determined by the method (3) specified in section EXAMPLES described later.

It is preferable that the proportion of carbon atoms (atom count percentage) derived from the ester group be larger near the surface with a larger pore diameter than near the surface with a smaller pore diameter. It is also preferable that the proportion of carbon atoms derived from the ester group be 1% or more and 10% or less near both surfaces.

From the viewpoint of sufficiently suppressing the adhesion of proteins, the coating polymer is preferably supported over the entire separation membrane, and in particular, it is preferably supported more thickly in the dense layer where the adhesion of proteins occurs more easily during long term use. For the present invention, therefore, it is important that in TOF-SIMS measurement of a cross section of a porous separation membrane, the normalized average intensity of the ion signal attributed to the biocompatible polymer in the dense layer be 2.0 times or more of the normalized average intensity of the ion signal attributed to the biocompatible polymer in the coarse layer. If the ratio in the normalized average intensity is less than 2.0, proteins will adhere particularly to the dense layer during long term use, leading to a decrease in the protein permeability. It is preferable that the normalized average intensity of the ion signal attributed to the biocompatible polymer in the dense layer be 2.5 times or more, more preferably 3.0 times or more, of the normalized average intensity of the ion signal attributed to the biocompatible polymer in the coarse layer. On the other hand, the separation performance and permeability of the separation membrane is likely to deteriorate if the biocompatible polymer exists in an excessively large amount, and accordingly, it is preferable that the normalized average intensity of the ion signal attributed to the biocompatible polymer in the dense layer be less than 10 times of the normalized average intensity of the ion signal attributed to the biocompatible polymer in the coarse layer.

In order to suppress the adhesion of proteins passing through the separation membrane, it is also preferable that the coating polymer be supported uniformly over the coarse layer. For the present invention, therefore, it is important that in TOF-SIMS measurement of a cross section of a membrane, the minimum value of the normalized intensity of the ion signal attributed to the biocompatible polymer in the coarse layer be 0.15 times or more of the maximum value of the normalized intensity of the ion signal attributed to the biocompatible polymer in the coarse layer. If such a ratio in the normalized average intensity is less than 0.15, proteins will adhere during long term use to cause a decrease in the protein permeation rate. It is more preferable that the minimum value of the normalized intensity of the ion signal attributed to the biocompatible polymer in the coarse layer be 0.20 times or more of the maximum value of the normalized intensity of the ion signal attributed to the biocompatible polymer in the coarse layer. On the other hand, this ratio in normalized intensity is not more than 1

From the viewpoint of further improving the protein permeability even during long term use, the normalized average intensity of the ion signal attributed to the biocompatible polymer in the coarse layer is preferably 0.5 or more, more preferably 1.0 or more, still more preferably 1.3 or more, and particularly preferably 1.5 or more. On the other hand, from the viewpoint of improving the permeability of the separation membrane, the normalized average intensity of the ion signal attributed to the biocompatible polymer in the coarse layer is preferably 20 or less, more preferably 15 or less, and still more preferably 10 or less.

Described below is the procedure for measuring the normalized average intensity of the ion signal attributed to a biocompatible polymer using a TOF-SIMS instrument. The measuring area is 100 μm×100 μm; the primary ion acceleration voltage is 30 kV; and the pulse width is 7.8 nS. The normalized intensity is calculated by dividing the detected intensity of the ion signal attributed to the biocompatible polymer by the intensity of the ion signal attributed to the polymer used as the primary component of the separation membrane. In addition, the normalized average intensity of the dense layer is calculated by averaging the normalized intensity of the ion signal attributed to the biocompatible polymer existing in the region over a 3 μm depth in the direction from the surface with smaller pore diameters toward the coarse layer in the separation membrane. Furthermore, the maximum and minimum values of the normalized intensity of the ion signal attributed to the biocompatible polymer in the coarse layer mean the maximum and minimum values, respectively, of the normalized intensity in the region accounting for 80% of the total membrane thickness measured from the surface with larger pore diameters toward the dense layer in the separation membrane. In addition, the normalized average intensity of the coarse layer is calculated by averaging the normalized intensity of the ion signal attributed to the biocompatible polymer existing in the above region. More specifically, it is determined by the method (2) specified in section EXAMPLES described later.

The weight average molecular weight of a coating polymer is preferably 1,000 or more and more preferably 5,000 or more, from the viewpoint of sufficiently suppressing the adhesion of proteins and further improving the protein permeability. On the other hand, the weight average molecular weight of a coating polymer is preferably 1,000,000 or less, more preferably 500,000 or less, and still more preferably 100,000 or less, from the viewpoint of the efficiency of introduction into the separation membrane. Here, the weight average molecular weight of a coating polymer can be determined by gel permeation chromatography (GPC). More specifically, it is determined by the method (1) specified in section EXAMPLES described later.

It is preferable that the coating polymer, particularly in the case where it is a polymer containing a monocarboxylic acid vinyl ester unit, be a copolymer containing a hydrophilic unit and a hydrophobic unit (hereinafter occasionally referred to simply as copolymer) and it is more preferable that the hydrophobic unit contains a monocarboxylic acid vinyl ester unit. If the surface of the separation membrane is coated with a hydrophilic polymer such as polyethylene glycol and polyvinyl alcohol, the adhesion of proteins will not be suppressed sufficiently in some cases. It is considered that this is because the surface of the separation membrane can be so high in hydrophilicity that the structure of proteins will become unstable, leading to insufficient suppression of the adhesion of proteins. In recent years, in particular, attention is focused on water around polymers. A polymer having high hydrophilicity interact strongly with water to reduce the motility of water around the polymer. On the other hand, proteins are considered to be stabilized by water called adsorbed water. Therefore, it is considered that if the adsorbed water on proteins and water around the polymer are close in mobility, the protein structure will not be destabilized, and the adhesion of proteins to the surface of the separation membrane can be suppressed. It is considered that a copolymer containing a hydrophilic unit and a hydrophobic unit can act to adjust the motility of water around polymer molecules if an appropriate hydrophilic group, hydrophobic group, and copolymerization ratio are adopted and that this serves to further improve the protein permeability. Here, the hydrophilic unit is characterized by the fact that a polymer produced by polymerizing only the monomers that constitute the unit to a weight average molecular weight of 10,000 to 1,000,000 is soluble in water. A polymer that is "soluble" has a solubility of more than 0.1 g in 100 g of water at 20° C.

It is more preferable for such a hydrophilic unit to be composed of monomers for which the aforementioned solubility is more than 10 g. Such monomers include, for example, vinyl alcohol monomer, acryloylmorpholine monomer, vinyl pyridine based monomers, vinyl imidazole based monomers, and vinyl pyrrolidone monomer. Two or more of these may be used in combination. In particular, monomers containing an amide bond, ether bond, or ester bond are preferable because they are not excessively high in hydrophilicity compared with monomers containing a carboxy group or sulfonic acid group and can realize a good balance with hydrophobic monomers. Among others, the vinyl acetamide monomer, which has an amide bond, vinyl pyrrolidone monomer, and vinyl caprolactam monomer are more preferable. Of these, the vinyl pyrrolidone monomer is still more preferable because its polymer is low in toxicity.

Thus, in a preferred embodiment of the present invention, the coating polymer further includes the vinyl pyrrolidone unit as a hydrophilic unit.

The monomer used in the hydrophobic unit at least contains a monocarboxylic acid vinyl ester, and may additionally contains an acrylic acid ester, methacrylic acid ester, vinyl-ε-caprolactam, or the like.

From the viewpoint of further suppressing the adhesion of proteins, the mole fraction of the hydrophobic unit is preferably 10% or more and 90% or less, more preferably 20% or more and 80% or less, and still more preferably 30% or more and 70% or less of the entire copolymer composed of the hydrophilic unit and the hydrophobic unit. Here, the hydrophobic unit may be purely a monocarboxylic acid vinyl ester unit or may be a mixture with other hydrophobic units. If the mole fraction of the hydrophobic unit is 90% or less, it serves to prevent an increase in the overall hydrophobicity of the copolymer and suppress the adhesion of proteins more strongly. On the other hand, if the mole fraction of the hydrophobic unit is 10% or more, it serves to prevent an increase in the overall hydrophilicity of the copolymer and avoid structural destabilization and modification of proteins, which will in turn serve to suppress the adhesion of proteins more strongly. Here, the mole fraction can be calculated, for example, from the peak area measured by nuclear magnetic resonance (NMR). If the mole fraction cannot be determined from NMR measurement because of overlapping of different peaks, the mole fraction may be calculated by elemental analysis.

It is particularly preferable for the coating polymer to be a copolymer composed of a monocarboxylic acid vinyl ester unit and a vinylpyrrolidone unit. In this case, the molar ratio between the vinylpyrrolidone unit and the monocarboxylic acid vinyl ester unit is preferably 30:70 to 90:10, more preferably 40:60 to 80:20, and still more preferably 50:50.

In terms of the alignment of units, examples of the above copolymer include block copolymers, alternating copolymers, and random copolymers. Of these, the use of an alternating copolymer or a random copolymer is preferable because the distribution in hydrophilicity and hydrophobicity is small over the entire copolymer. In particular, the use of a random copolymer is more preferable because of easy synthesis.

Here, although not essential, it is preferable that the coating polymer be immobilized on the separation membrane by chemical bonding from the viewpoint of preventing the coating polymer from being eluted during use. Methods for immobilization will be described later.

Various forms of the separation membrane according to the present invention include flat membrane and hollow fiber membrane, of which the use of a hollow fiber membrane is preferable from the viewpoint of efficiency of processing.

Examples of polymer materials for the separation membrane according to the present invention include polysulfone based polymers, polystyrene, polyurethane, polyethylene, polypropylene, polycarbonate, polyvinylidene fluoride, and polyacrylonitrile. Two or more of these may be used in combination. In particular, polysulfone based polymers are used suitably because they are easy to process to form separation membranes and they serve to easily coat a polymer containing a monocarboxylic acid vinyl ester unit.

For the present invention, a polysulfone based polymer is a polymer having an aromatic ring, a sulfonyl group, and an ether group in the main chain, and examples thereof include polysulfone, polyethersulfone, and polyallylethersulfone. For the present invention, it is preferable to use a polysulfone based polymer containing a repeating unit as represented by the formula (1) or (2) given below.

[Chemical compound 1]

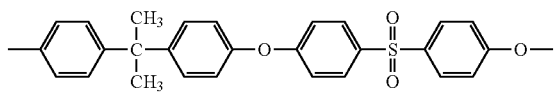
(1)

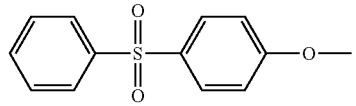
(2)

In addition to the repeating unit represented by the above formula (1) or (2), the polysulfone polymer may also contain other repeating units unless they impair the effect of the present invention. In this case, it is preferable for such other repeating units to account for 10 mass % or less of all repeating units. In the polysulfone based polymer, furthermore, a hydrogen atom in the hydrocarbon backbone may be substituted with an alkyl group, functional group, halogen atom, or other atoms, and the polymer may be modified.

For the present invention, a polysulfone based polymer as represented by the following formula (3) or (4) and containing only a repeating unit as represented by the above formula (1) or (2) is used suitably.

[Chemical compound 2]

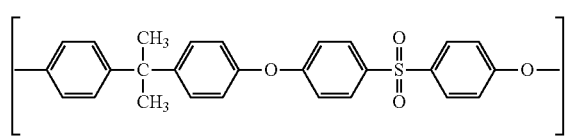
(3)

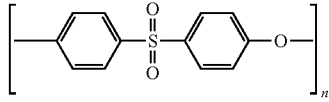
(4)

In the formulae (3) and (4), n is an integer of 50 or more and preferably an integer of 50 to 200.

Specific examples of such a polysulfone based polymer include Udel (registered trademark) P-1700 and P-3500 (manufactured by SOLVAY) and Ultrason (registered trademark) S3010 and S6010 (manufactured by BASF). Two or more of these may be used in combination.

Here, containing a polysulfone based polymer as primary component means that the polysulfone based polymer accounts for 50 mass % or more of all components constituting the separation membrane. It is preferable for the polysulfone based polymer to account for 75 mass % or more, more preferably 90 mass % or more, of all components constituting the separation membrane.

It is preferable for the separation membrane according to the present invention to further contain a hydrophilic polymer. Specifically, the separation membrane according to the present invention preferably contains a resin mixture of a polysulfone polymer as described above and a hydrophilic polymer. The hydrophilic polymer has a role of acting as a pore-forming agent in the process for producing a porous separation membrane of a polysulfone based polymer, adjusting the viscosity of the spinning dope solution, and imparting the function of suppressing the adhesion of proteins. Here, the hydrophilic polymer used for the present invention is a polymer that is soluble in water or ethanol and is preferably a polymer having a solubility of 0.1 g/mL or more in these liquids at 20° C.

The hydrophilic polymer is preferably a polymer that is compatible with good solvents for the polysulfone based polymer and also with the polysulfone-based polymer. Examples of such a hydrophilic polymer include polyvinylpyrrolidone, polyethylene glycol, polyvinyl alcohol, and copolymers thereof. Examples of the copolymers include a copolymer of vinylpyrrolidone with vinyl acetate, vinyl propionate, vinyl butanoate, or the like. Two or more of these may be used in combination. In particular, the use of polyvinylpyrrolidone or a copolymer thereof is preferable from the viewpoint of the compatibility with a polysulfone based polymer.

The use of a hydrophilic polymer having a relatively low molecular weight (with a weight average molecular weight of 1,000 to 200,000) woks to enhance the pore-forming function, thereby serving to provide a hollow fiber membrane having an improved water permeability. On the other hand, if a hydrophilic polymer having a relatively high molecular weight (with a weight average molecular weight of 200,000 to 1,200,000) is used, it will easily remain in the hollow fiber membrane and contribute to improving the hydrophilicity of the hollow fiber membrane because it has a long molecular chain and interacts strongly with the polysulfone based polymer. Therefore, it is more preferable to use a combination of a low molecular weight and a high molecular weight hydrophilic polymer.

Antibodies are relatively expensive as compared with other biopharmaceuticals. Various separation and purification steps are included in the manufacturing process and therefore, it is necessary to minimize the loss of antibodies. In particular, a separation membrane has a large surface area and easily adsorbs antibodies, and therefore, it easily causes a decrease in the recovery rate. When the treatment is carried out by using a series of two or more separation membranes, in particular, a decrease in the antibody recovery rate due to the adhesion of antibodies to the separation membrane can be a serious problem. Therefore, the antibody recovery rate is preferably 80% or more, more preferably 85% or more, and still more preferably 90% or more.

Furthermore, if antibodies or the protein to be removed adhere to the separation membrane, the processing speed decreases due to an increase in the amount of the liquid to be processed, thus leading to an extension of the processing time and a decrease in the antibody recovery rate. Therefore, it is preferable that such a decrease in the processing speed due to an increase in the amount of the liquid to be processed be avoided. For example, when a liquid to be processed that contains a protein is processed under a constant pressure of 50 to 200 kPa, the permeability retention rate, which is defined as the ratio of the time required for the permeation of the 195 to 200 mL portion of the filtrate to the time required for the permeation of the first 0 to 5 mL portion of the filtrate, is preferably 50% or more, more preferably 60% or more, and still more preferably 70% or more, under the condition where the protein processing rate is 200 g/m$^2$.

A common biopharmaceutical manufacturing process contains a cell culture step for producing an antibody using animal cells, a step for separating cells from antibodies, a step for recovering the antibodies produced, a step for purification, a step for virus inactivation, and a step for virus removal. The step for separating cells from antibodies is performed by the centrifugal separation technique or the depth filtration technique. Recovery of the antibodies produced is performed mainly by using a protein A column that contains immobilized protein A that specifically adsorbs antibodies. In the step for purification, a cation exchange column or an anion exchange column is used to remove the animal cell-derived protein (host cell protein) employed for antibody production. The step for virus inactivation is generally performed at a low pH value of pH4 or less.

As described above, the separation membrane according to the present invention is highly non-adhesive to proteins and therefore can be used in the step for separating cells and antibodies. In the antibody recovery step, furthermore, it can be used for removing aggregates of antibodies that are difficult to remove by a protein A column. In addition, it can be used to remove cell-derived proteins by size separation in the antibody purification step. When the separation membrane according to the present invention is applied to the virus removal step, it is preferable to use it as a virus removal membrane in the final stage of the above-mentioned common biopharmaceutical manufacturing process.

In particular, the current biopharmaceutical manufacturing process has the problem of low efficiency because each step is performed in a batch-wise manner. As compared with this, it is preferable to adopt an apparatus containing a series of separation membranes having different pore diameters to suit the size of the substances to be removed in each stage of the manufacturing process so that a solution containing cells and proteins is continuously processed to remove and recover the intended cells or proteins. This method can achieve a high productivity and work effectively in the manufacturing process.

Furthermore, it can be applied not only to the manufacturing process for biopharmaceuticals but also to a step for virus removal from blood products. In addition, it can also be applied to medical fields such as hemodialysis for removing impurities in blood, plasma separation for separating blood cell components and plasma components in blood, and cell-free and concentrated ascites reinfusion therapy (CART) as well as food manufacturing fields such as beverages containing proteins and water processing fields.

As an example for the porous separation membrane according to the present invention, an method for producing a hollow fiber membrane containing the aforementioned polysulfone based polymer as primary component is described below. Phase separation is a good means for producing a hollow fiber membrane. Useful phase separation techniques include the technique of inducing phase separation using a poor solvent (non-solvent induced separation, NIPS) and the techniques of inducing phase separation by cooling a high temperature spinning dope solution containing a relatively low-solubility solvent (thermally induced phase separation, TIPS), of which the technique of inducing phase separation using a poor solvent is particularly good for forming a membrane.

In the course of this membrane forming process, a porous hollow fiber membrane of a specific structure is formed as phase separation is advanced by the contact between the spinning dope solution and the poor solvent. In particular, in the case where a membrane is formed by discharging a poor solvent, which is used as injection liquid, into the inner tube of the double tube spinneret while supplying a spinning dope solution into the outer tube, phase separation begins from the inner side (inner surface) of the hollow fiber membrane where the spinning dope solution and the poor solvent come into contact with each other. Following this, the poor solvent diffuses in the membrane thickness direction to cause continuous progress of phase separation. In the structure formed here, those pores located near the inner surface of the porous hollow fiber membrane, where the concentration of the poor solvent is at a maximum, are smallest in diameter to firm a dense layer near the inner surface while the pore diameter becomes larger to form coarser layers toward the interior of the membrane. The pore diameter and the thickness of the dense layer located near the inner surface can be controlled by changing the phase separation rate described above. Specifically, the concentration and discharge temperature of the poor solvent and the concentration of the polysulfone based polymer in the spinning dope solution may be adjusted appropriately. In particular, changing the poor solvent concentration is effective to control the pore size and dense layer thickness. By adjusting the concentration of the poor solvent, the diffusion rate of the poor solvent is changed, and the pore size of the surface and the thickness of the dense layer can be adjusted. Another means is to increase the concentration of the polysulfone based polymer in the spinning dope solution, which allows the polysulfone based polymer, i.e., the primary component of the hollow fiber membrane, to be present so densely that the thickness of the dense layer will be increased.

An increase in the concentration of the polysulfone based polymer in the spinning dope solution serves to produce a hollow fiber membrane with an increased mechanical strength. Accordingly, the concentration of the polysulfone based polymer in the spinning dope solution is preferably 10 mass % or more. On the other hand, a decrease in the concentration polysulfone based polymer works to increase the solubility, thereby serving to suppress the viscosity increase of the spinning dope solution. Accordingly, the polymer density at the inner surface of the hollow fiber membrane can be appropriately suppressed to ensure an increase in water permeability and molecular weight cut-off. Thus, the concentration of the polysulfone based polymer in the spinning dope solution is preferably 30 mass % or less.

When dissolving a polysulfone based polymer, it is preferable to dissolve it at a high temperature in order to ensure a high solubility, but there is a concern that compositional change may occur due to modification of the polymer, evaporation of the solvent, etc. caused by heating. Accordingly, the dissolution temperature is preferably 30° C. or more and 120° C. or less. It is noted here that these optimum ranges may change depending on the types of polysulfone polymer and additives used.

Furthermore, if a hydrophilic polymer as described above is added to the spinning dope solution, it can be expected that it will work as a pore-forming agent to ensure increased water permeability or serves to suppress the adhesion of proteins as a result of increased hydrophilicity. In addition, the addition of a hydrophilic polymer makes it possible to adjust the viscosity of the spinning dope solution appropriately and suppress the formation of macrovoids that can cause a decrease in the membrane strength. The optimum amount of a hydrophilic polymer added to a spinning dope solution varies depending on its type and the desired performance, but is preferably 1 mass % or more and preferably 20 mass % or less of the total mass of the spinning dope solution.

The liquid (injection liquid) discharged through the inner tube of the double tube spinneret is a liquid mixture of a good solvent and a poor solvent for the polysulfone based polymer, and accordingly, the water permeability and the molecular weight cut-off, that is, the pore diameter, of the hollow fiber membrane can be controlled by changing the ratio between them. The poor solvent to be used is not particularly limited, but useful examples include water and alcohol solvents such as ethanol and isopropyl alcohol, of which water can be used most suitably. The good solvent to be used is not particularly limited, but useful examples include N-methyl pyrrolidone and N,N-dimethyl acetamide.

When the aforementioned spinning dope solution and injection solution come into contact with each other, phase separation of the spinning dope solution is induced by the action of the poor solvent and its coagulation proceeds. The optimum ratio between the two in the injection liquid varies depending on the types of the good solvent and poor solvent, but it is preferable for the poor solvent to account for 10 mass % or more of the liquid mixture of the two solvents while it preferably accounts for 80 mass % or less.

The temperature of the double tube spinneret during the discharge step can affect the viscosity of the spinning dope solution, its phase separation behavior, and the diffusion rate of the injection liquid into the spinning dope solution. In general, as the temperature of the double tube spinneret increases, the diffusion rate of the poor solvent increases to promote the phase separation and the resulting hollow fiber membrane will have a larger pore size and a higher water permeability and molecular weight cut-off. The temperature of the double tube spinneret is preferably 20° C. or more whereas it is preferably 90° C. or less.

Aside from this, the longer diameter relative to the short diameter of the surface can be increased by increasing the draft ratio (=linear discharge speed of the spinning dope solution/take-up speed of the thread) to allow the spinning dope solution to be stretched largely before it solidifies. The problems of breakage and cracking that may occur in the stretching method can be avoided because the spinning dope solution is stretched before it solidifies. The draft ratio is 1.5 or more, preferably 2.0 or more, and more preferably 2.5 or more. On the other hand, thread breakage will occur if the draft ratio is too large, and therefore, it is necessary for the draft ratio to be 10 or less, preferably 9 or less.

After being discharged from the double tube spinneret, it is preferable for the thread to run through a predetermined distance called a dry section. In the dry section, as the outer surface comes into contact with air, moisture is taken in from the air and then it works as a poor solvent to promote the phase separation. Therefore, the opening rate in the outer surface can be controlled by adjusting the dew point of the dry section. The dew point of the dry section is preferably 60° C. or less whereas it is preferably 10° C. or more.

The length of the dry section is preferably 50 mm or more and more preferably 100 mm or more. On the other hand, the length of the dry section is preferably 600 mm or less.

After running through the dry section, the thread is preferably introduced into a coagulation bath containing a poor solvent for the polysulfone based polymer as primary component. Water is used suitably as the poor solvent. As the spinning dope solution enters the coagulation bath, the spinning dope solution is coagulated by a large amount of the poor solvent in the coagulation bath, and the membrane structure is immobilized. Here, the coagulation bath may contain a good solvent as required. As the temperature of the coagulation bath is increased, or as the concentration of the good solvent is increased, coagulation is suppressed to promote the phase separation, leading to a higher water permeability and a higher molecular weight cut-off.

The hollow fiber membrane produced through coagulation in the coagulation bath contains a surplus of the hydrophilic polymer derived from the solvent and/or the spinning dope solution, and therefore, it is preferable to wash it next. Washing is performed preferably by passing the membrane through a solvent containing suitable components to dissolve the surplus hydrophilic polymer while leaving the polysulfone based polymer undissolved. Examples of the solvent include alcohols such as ethanol, aqueous solutions containing good solvents to the extent that the polysulfone based polymer is not dissolved, and water. In particular, water is preferable from the viewpoint of handleability. Furthermore, since the washing efficiency can be increased by raising the temperature of the solvent used for washing, the washing temperature is preferably 50° C. to 100° C.

The resulting porous membrane may be immersed in an aqueous solution of a non-volatile compound such as glycerin in order to prevent a change in pore size that may be caused by drying, etc.

Here, the resulting porous membrane may be dried. Examples of good drying methods include hot air drying, microwave drying, and vacuum drying, of which hot air drying is used suitably.

Furthermore, for a porous membrane in the form of a hollow fiber membrane, it will be effective to impart a crimped structure because such a membrane serves to improve the dialysate flow when used after being modularized. The pitch of crimped structure is preferably in the range of 5 to 30 mm and the amplitude is preferably in the range of 0.2 to 3 mm.

The thread diameter of the hollow fiber membrane is not particularly limited, but it can be measured by the following method. The thickness of 16 randomly selected hollow fiber membrane samples is measured with a Microwatcher 1000× lens (VH-Z100, manufactured by KEYENCE Corporation), and the average a was determined, followed by calculation by the following formula. Here, to determine the outer diameter of a hollow fiber membrane, the outer diameter of 16 randomly selected hollow fiber membrane samples is measured with a laser displacement gauge (for example LS5040 T, manufactured by KEYENCE Corporation), followed by calculating the average.

Inner diameter of hollow fiber membrane (μm)=outer diameter of hollow fiber membrane−2×membrane thickness Available methods for modularizing the porous hollow fiber membrane include the method of fixing it in a case while centrifuging it and the method of forming the hollow fiber membrane into a U shape and fixing only the opening portion of the hollow fiber membrane in a case. Although there are no particular limitations, an example is described below. First, the hollow fiber membrane is cut to a required length, and the required number of cut pieces are bundled, and placed in a tubular case. Then, temporary caps are put on both ends, and potting material is put in both ends of the hollow fiber membrane. At this time, the method of inserting the potting material while rotating the module in a centrifuge is a desirable method because it can be filled uniformly with the potting material. After the potting material has solidified, both end portions are severed so that both ends of the hollow fiber membrane are cut open. Inflow ports (headers) for the liquid to be processed are attached to both ends of the housing, and the headers and the nozzle units on the housing are plugged to provide a hollow fiber membrane module.

Examples of a method for supporting a coating polymer on the porous separation membrane include the method of adding the coating polymer to the spinning dope solution or the injection solution used for membrane formation and the method of bringing the coating polymer solution into contact with the surface after membrane formation. Of these, the method of bringing the coating polymer solution into contact after membrane formation is preferable from the viewpoint of avoiding an influence on the membrane formation conditions. Examples of such a method include the method of immersing the separation membrane in a coating polymer solution, the method of passing a solution through it, the method of spraying a solution, of which any one can serve favorably. In particular, the method of passing a coating polymer solution through the separation membrane is preferable because it can serve to allow the coating polymer to be applied to inner parts of the separation membrane.

When the coating polymer solution is passed through the separation membrane, the concentration of the coating polymer in the coating polymer solution is preferably 10 ppm or more, more preferably 100 ppm or more, and still more preferably 300 ppm or more, from the viewpoint of introducing the coating polymer more efficiently, On the other hand, from the viewpoint of suppressing the elution from the module, the concentration of the coating polymer in the above aqueous solution is preferably 100,000 ppm or less and more preferably 10,000 ppm or less.

Water is preferable as the solvent used to prepare the coating polymer solution. However, if it does not dissolve in water to a required concentration, the coating polymer may be dissolved in an organic solvent that does not dissolve the separation membrane or in a solvent mixture of water with an organic solvent that is compatible water but does not dissolve the separation membrane. Examples of such an organic solvent or such an organic solvent component for a solvent mixture include, but not limited to, alcoholic solvents such as methanol, ethanol, and propanol.

The direction in which the coating polymer solution is to be passed through the separation membrane may be either from the dense layer side to the coarse layer side or from the coarse layer side to the dense layer side of the separation membrane, but it is preferable that the coating polymer be passed from the coarse layer side to the dense layer side from the viewpoint of efficiently applying the coating polymer to inner parts of the separation membrane. If the molecular size of the coating polymer used is larger than the pore size in the dense layer, the coating polymer will not pass through the pores if the liquid is supplied from the dense layer side. Instead, it will be concentrated on the surface of the dense layer, making it difficult to allow the coating polymer to be supported on the coarse layer.

When passing a coating polymer solution, it is preferable to apply a pressure because the polymer will be pressed against the surface of the separation membrane, serving to increasing the coating efficiency. The pressure applied during the coating step is preferably 10 kPa or more and more preferably 50 kPa or more. On the other hand, if the pressure is too high, a coating amount of the polymer will be too large and affect the permeability of the separation membrane. Therefore, it is preferably 300 kPa or less and more preferably 200 kPa or less.

Furthermore, as described above, it is preferable that the coating polymer be immobilized on the separation membrane by chemical bonding. The method to be used for immobilizing it by chemical bonding is not particularly limited, but good methods include the method of irradiating radiation after bringing the coating polymer into contact and the method of introducing reactive groups such as amino groups and carboxyl groups into the coating polymer or the surface of the separation membrane where it is to be immobilized, followed by condensing it.

Good methods for introducing reactive groups into the surface of a separation membrane include the method of polymerizing monomers having reactive groups to prepare a substrate with reactive groups on its surface and the method of introducing reactive groups by performing ozone treatment or plasma treatment after polymerization.

For the irradiation, α-ray, β-ray, γ-ray, X-ray, ultraviolet ray, electron beam, and the like can be used. Radiation is applied after bringing a solution containing a dissolved coating polymer into contact with the separation membrane in a separation membrane module or after applying a coating polymer to the surface first and subsequently removing the solution from the separation membrane module or subsequently drying the separation membrane. This method is preferable because the separation membrane module can be sterilized at the same time as the coating polymer is immobilized. In that case, the irradiation dose of the radiation is preferably 15 kGy or more and more preferably 25 kGy or more. If the irradiation dose is too high, on the other hand, it may accelerate the deterioration and decomposition of the polymer, and therefore, the irradiation dose is preferably 100 kGy or less.

Furthermore, an antioxidant may be added in order to suppress the crosslinking reaction of the coating polymer that may be caused by the application of radiation. An antioxidant means a substance that has the function of easily donating electrons to other molecules, and examples thereof include, not limited to, water soluble vitamins such as vitamin C, polyphenols, and alcoholic solvents such as methanol, ethanol, and propanol. These antioxidants may be used singly or in combination of two or more thereof. When safety must be taken into consideration, it is preferable to use a low toxicity antioxidant such as ethanol and propanol.

When a hollow fiber membrane is irradiated with radiation in a dry state where the water contained accounts for 20% or less of its own weight, a decomposition reaction is more likely to proceed than crosslinking of the coating polymer etc. Therefore, in order to suppress the decomposition reaction, the oxygen concentration at the time of irradiation is preferably 1% or less and more preferably 0.5% or less.

From the viewpoint of productivity, the permeation speed of a protein solution passing through the separation membrane is preferably 200 mL/m$^2$/h/kPa or more, preferably 400 mL/m$^2$/h/kPa or more, and still more preferably 600 mL/m$^2$/h/kPa or more. On the other hand, if the permeation speed is too high, the shear stress at the time of contact with the separation membrane becomes so high that the proteins may be denatured. Therefore, it is preferably 20,000 mL/m$^2$/h/kPa or less and more preferably 15,000 mL/m$^2$/h/kPa.

The thickness of the dense layer can be measured by the following procedure. The hollow fiber membrane is wetted by immersing it in water for 5 minutes, frozen in liquid nitrogen, and immediately broken or cut it with a microtome in a cryostat in order to expose a cross section. Then, the hollow fiber membrane was freeze-dried to provide a specimen for observation. The cross section of the hollow fiber membrane is observed at a magnification of 10,000 times using SEM (S-5500, manufactured by Hitachi High-Technologies Corporation), and the image data taken are stored in a computer. The size of the image to be taken is not particularly limited, but a size of 640 pixels×480 pixels is preferred. If the pores in the cross section observed by SEM are in a blocked state, another specimen is prepared. Blocking of pores may occur as the hollow fiber membrane is deformed in the direction stress caused by cutting. From a SEM image, a portion measuring 1 μm in parallel to the surface of the hollow fiber membrane and an appropriate depth in its depth direction is cut out and image analysis is performed using image processing software. The size of the analyzed region in the thick direction of the membrane is not limited as long as it is long enough to include the dense layer. If the whole dense layer is not contained in the field of view observed at the aforementioned magnification, two or more SEM images may be combined to include the whole dense layer. An appropriate threshold value was set so that the structure portions were high in brightness while the other portions were low in brightness in performing binarization operation, thereby providing an image in which the high brightness portions were white while the low brightness portions were black. If the structure portions and the other portions cannot be separated by means of a difference in contrast in the image, the image may be divided into parts each having the same contrast level, which are combined back into one image after binarizing the data in each part. If there are two pores that overlap each other in the depth direction, the shallower one is adopted for measurement. If there was a pore which is partly outside the observed range, it was excluded. Any image contains noise. If there is a low brightness portion that consists of only five or less pixels lined up in a row, it cannot be distinguished from noise. In that case, it is regarded as a high brightness portion that is part of a structure. To erase noise, any low brightness portion that consists of five or less pixels lined up in a row is excluded in the pixel counting step. The number of pixels is counted on the scale bar that shows known lengths in the image, and the length per pixel is calculated. The number of pixels per pore is determined, and the number of pixels per pore is multiplied by the square of the length per pixel to calculate the area of a pore. The diameter of a circle that corresponds to the pore area was calculated by the following formula and used to represent the pore diameter.

$$\text{Pore diameter} = (\text{pore area/circular constant})^{1/2} \times 2$$

For example, the thickness of a dense layer that contains no observable pore having a pore diameter of 130 nm or more can be determined by the following method.

A pore with a pore diameter of 130 nm has an area of $1.3 \times 10^4$ (nm$^2$).

Pores with a pore diameter of 130 nm or more were identified, and a layer in which those pores were not observed was defined as the dense layer and the thickness of this dense layer was measured in the direction perpendicular to the surface. A line perpendicular to the surface was drawn and the shortest of the distances between the surface and the pores with pore diameters of 130 nm or more existing on the perpendicular line (that is, the distance from the surface to the pore with a pore diameter of 130 nm or more located closest to the surface) was determined. Measurements were taken from five different points on an image. Similar measurements were taken from a total of five images, and the 25 measurements obtained were averaged and rounded off to the second decimal place to provide a value adopted to represent the thickness of the dense layer.

To identify pores with pore diameters of 130 nm or more, a lower limit of the pore area to be detected is set when analyzing an image with image processing software.

EXAMPLES

The present invention will be described below with reference to examples, though the present invention is not limited to these examples.

(1) Weight Average Molecular Weight of Coating Polymer

A 0.1 N LiNO$_3$ solution with a water/methanol ratio of 50/50 (by volume) was prepared to use as a GPC eluent. The coating polymer used in each Example and Comparative example was dissolved in this solution to a concentration of 1 mg/mL. A 100 μL portion of this polymer solution was poured into a Prominence GPC system (manufactured by Shimadzu Corporation) that was connected to a column (GMPW$_{XL}$, manufactured by Tosoh Corporation). The flow rate was 0.5 mL/min and the measuring time was 30 minutes. A differential refractometer was used for detection, and the weight average molecular weight was calculated from the peak attributed to the coating polymer that appeared around an elution time of about 15 minutes. The calculated weight average molecular weight was rounded off to hundreds place. A calibration curve was prepared by using a polyethylene oxide standard sample (0.1 kD to 1258 kD) manufactured by Agilent.

(2) TOF-SIMS Measurement

A hollow fiber membrane sample prepared in each Example and Comparative example was wetted by immersing it in water for 5 minutes and then cut to a length of about 1 cm or less using a single-edged blade or the like. While maintaining it in a wetted state, the hollow fiber membrane sample was frozen quickly to form a sample block. The sample block was attached to an ultramicrotome with a CryoSystem, sliced to a thickness of 200 nm at a temperature of −65° C., and mounted on a slide glass to prepare a specimen for measurement. The specimen for measurement was dried at room temperature under normal pressure for 10 hours before subjecting it to measurement. The equipment and conditions used for measurement were as described below.

Measuring equipment: TOF.SIMS5 (manufactured by ION-TOF)
Primary ion: Bi$_3^{++}$
Primary ion: accelerating voltage: 30 kV
Pulse width: 7.8 ns
Secondary ion polarity: positive
Number of scans: 16 scans/cycle
Measuring range: 100×100 μm$^2$
Mass range (m/z): 0 to 1,500

The resulting spectrum in mass m/z was examined to determine whether the carboxylic acid ion that acts as an ion signal peculiar to the biocompatible polymer used in each Example was present in the hollow fiber membrane. If the proportion of the intensity of the carboxylic acid ion to the total intensity of secondary ions is 0.1% or less, however, the signal is regarded as noise and assumed to indicate that the carboxylic acid is not present.

From the secondary ion image obtained, a line profile was extracted from a range with a length of 20 μm parallel to the inner surface of the hollow fiber membrane and an appropriate thickness-directional size to contain a cross section of the hollow fiber membrane, and the intensity of the ion signal was calculated. Here, the range where the intensity of the ion signal attributed to the polymer used as the main component of the hollow fiber membrane was not regarded as noise, that is, the range where the intensity of the ion signal attributed to polysulfone was 10 or more in the case where a polysulfone based polymer was used as the main component of the hollow fiber membrane, was defined as the cross-sectional area of the membrane, and both ends of the range were assumed to represent the surfaces of the membrane. If the observation size was not large enough to contain the whole cross section of the membrane, two or more secondary ion images were combined so that it would be contained. FIG. 1 shows an example of a total secondary ion image obtained by observing a cross section of a porous separation membrane by TOF-SIMS. In FIG. 1, the rectangular area denoted by the reference number 1 represents the range from which a line profile was extracted.

The detected intensity of the ion signal attributed to carboxylic acid was divided by the intensity of the ion signal attributed to the polymer used as the primary component of the hollow fiber membrane to calculate the normalized intensity. In addition, the normalized intensity of the ion signal attributed to carboxylic acid was averaged across the 3 μm (rounded off to a whole number) region ranging from the surface with smaller pore diameters toward the coarse layer in the hollow separation membrane to calculate the normalized average intensity of the dense layer. Furthermore, the maximum and minimum values of the normalized intensity of the ion signal attributed to carboxylic acid in the coarse layer were determined as the maximum and minimum values, respectively, of the normalized intensity in the region that accounts for 80% of the total membrane thickness of the separation membrane (the range measuring 40 μm when the membrane thickness was 50 μm) measured from the surface with larger pore diameters toward the dense layer in the separation membrane. In addition, the normalized intensity of the ion signal attributed to carboxylic acid in the above region was averaged to calculate the normalized average intensity in the coarse layer. Here, in each Examples and Comparative example, similar measurements were taken from three different cross sections, and the measurements of the normalized average intensity in the dense layer and the coarse layer in these cross sections were averaged and rounded off to the second decimal place. Furthermore, the averages of the maximum values and the minimum values in the coarse layers in these cross sections were calculated, and the ratio between the minimum value and the maximum value was calculated from the results obtained and rounded off to the second decimal place.

(3) X-Ray Photoelectron Spectroscopy (XPS) Measurement

The hollow fiber membrane prepared in each Example and Comparative example was cut into a semicylindrical shape with a single-edged blade, and the inner surface or the outer surface of the hollow fiber membrane was examined. A sample for measurement was rinsed first with ultrapure water and dried at room temperature under 0.5 Torr for 10 hours before subjecting it to measurement. The equipment and conditions used for measurement were as described below.

Measuring equipment: ESCALAB 220iXL (manufactured by VG)
Excited X-ray: monochromatic Al Kα1, 2 ray (1486.6 eV)
X-ray beam diameter: 0.15 mm
Photoelectron take-off angle: 90° (inclination of detector from specimen surface)

The resulting photoelectron spectrum was examined to determine whether the ester group (COO) was present in the separation membrane. C1s peak is composed of five components: a component mainly derived from CH$_x$, C—C, C═C, and C—S, a component attributed mainly to C—O and C—N, a component derived from π-π* satellite, a component derived from C═O, and a component derived from attributed to COO. The peak was split into the above five components. The component derived from COO gives a peak that appears at +4.0 to 4.2 eV from the main peaks of CH$_x$ and C—C(around 285 eV). The peak area ratio of each component was calculated and rounded off to the first decimal place. If results of peak splitting show that the proportion of the peak area derived from the ester group to the total peak area derived from carbon is 0.4% or less, it is regarded as noise and assumed to indicate that the ester group is not present. Here, measurements were taken from two different points on the separation membrane, and the average of the values obtained at the two points was used.

(4) Protein Permeability Measurement

A phosphate buffer solution with 2.0 g/L of albumin (derived from bovine serum, manufactured by Wako Pure Chemical Industries, Ltd.) or 2.0 g/L of IgG (derived from human serum, manufactured by Oriental Motor Co., Ltd.) was prepared to use as a starting solution. A 200 mL portion of the starting solution obtained above was allowed to flow through the hollow fiber membrane module prepared in each Example and Comparative example from the outer surface to the inner surface of the hollow fiber membrane while applying a pressure of 200 kPa. During this step, 5 mL portions of the filtrate were sampled. The protein permeation speed retention rate was calculated by the formula given below from the time ($F_{5\ mL}$) required for the permeation of the first 0 to 5 mL portion of the filtrate and the time ($F_{100\ mL}$) required for the permeation of the 95 to 100 mL portion or that ($F_{200\ mL}$) for the 195 to 200 mL portion of the filtrate.

Protein permeation speed retention rate (%)=($F_{100\ mL}$ or $F_{200\ mL}$)/($F_{5\ mL}$)×100

In addition, the protein permeation rate was calculated by the formula given below from the absorbance at 280 nm ($A_{5\ mL}$, $A_{100\ mL}$, $A_{200\ mL}$) of the solution obtained and rounded off to a whole number.

Protein permeation rate (%)=($A_{100\ mL}$ or $A_{200\ mL}$)/($A_{5\ mL}$)×100

(5) Measurement of Permeation Speed of Protein Solution

Using the value obtained in (4) above, a calculation is made and rounded off to the nearest ten.

Protein permeation speed (mL/m$^2$/hr/kPa)=5 mL/$A$/$F_{5\ mL}$/200 kPa

A: effective membrane area of separation membrane (m$^2$)

Example 1

First, 20 parts by weight of polysulfone (Udel (registered trademark) P-3500, manufactured by SOLVAY), 6 parts by weight of polyvinylpyrrolidone (Povidone (PLASDONE) K29/K32, manufactured by ASHLAND LCC), and 3 parts by weight of polyvinylpyrrolidone (Povidone (PLASDONE) K90, manufactured by ASHLAND LCC) were added to a solution containing 70 parts by weight of N,N-dimethylacetamide and 1 part by weight of water and dissolved by heating at 90° C. for 14 hours to prepare a spinning dope solution. This spinning dope solution was discharged from an orifice type double tube spinneret adjusted to 40° C. while at the same time, a solution containing 72 parts by weight of N,N-dimethylacetamide and 28 parts by weight of water was discharged from the inner tube as an injection liquid, and the discharged liquids were allowed to pass through a dry section with a length of 350 mm and introduced into a coagulation bath containing water at 40° C. to provide a hollow fiber membrane of an asymmetric structure having a dense layer near the inner surface and a coarse layer near the outer surface. The resulting hollow fiber membrane obtained had an inner diameter of 280 μm and a membrane thickness of 50 μm. The dense layer, which contained no observable pore having a pore diameter of 130 nm or more, had a thickness of 5.27 μm.

Ten hollow fiber membranes prepared as above were packed in a case with a diameter of about 5 mm and a length of about 17 cm, and both ends were potted with an epoxy resin based chemical reaction type adhesive (Quick Mender, manufactured by Konishi Co., Ltd.) and cut open to produce a hollow fiber membrane module. The hollow fiber membranes in the resulting module and the inside of the module were washed with distilled water for 30 minutes. Then, an aqueous solution was prepared by dissolving a vinylpyrrolidone-vinyl propanoate random copolymer (molar fraction of vinyl propanoate units 40% and weight average molecular weight 68,000) and ethanol in such a manner that they would have concentrations of 100 ppm and 1,000 ppm, respectively, and 10 mL thereof was passed from outside to inside of the hollow fiber membranes under an applied pressure of 100 kPa to ensure that the entire membranes would be coated. Then, 25 kGy of γ-ray was applied to provide a hollow fiber membrane module 1.

Example 2

Except that 15 mL of the aqueous solution of a vinylpyrrolidone-vinyl propanoate random copolymer (molar fraction of vinyl propanoate units 40% and weight average molecular weight 68,000), which was used as coating solution, was passed through the membranes, the same procedure as in Example 1 was carried out to provide a hollow fiber membrane module 2.

Example 3

Except that a vinylpyrrolidone-vinyl acetate copolymer (KOLLIDON (registered trademark) VA64, manufactured by BASF) was used as the polymer component of the coating solution, the same procedure as in Example 1 was carried out to provide a hollow fiber membrane module 3.

Example 4

Except that a vinylpyrrolidone-vinyl pivalate random copolymer (molar fraction of vinyl pivalate units 50% and weight average molecular weight 7,700) was used as the polymer component of the coating solution, the same procedure as in Example 1 was carried out to provide a hollow fiber membrane module 4.

Example 5

Except that a vinylpyrrolidone-vinyl hexanoate random copolymer (molar fraction of vinyl hexanoate units 40% and weight average molecular weight 2,200) was used as the polymer component of the coating solution, the same procedure as in Example 1 was carried out to provide a hollow fiber membrane module 5.

Example 6

Except that a vinylpyrrolidone-vinyl propanoate random copolymer (molar fraction of vinyl propanoate units 40% and weight average molecular weight 100,000) was used as the polymer component of the coating solution, the same procedure as in Example 1 was carried out to provide a hollow fiber membrane module 6.

Example 7

Except that 2.5 mL of the aqueous solution of a vinylpyrrolidone-vinyl propanoate random copolymer (molar fraction of vinyl propanoate units 40% and weight average molecular weight 68,000), which was used as coating solution, was passed through the membranes, the same procedure as in Example 1 was carried out to provide a hollow fiber membrane module 7.

Example 8

Except that a pressure of 50 kPa was applied during coating, the same procedure as in Example 1 was carried out to provide a hollow fiber membrane module 8.

Comparative Example 1

Except for omitting the supply of the aqueous solution of a vinylpyrrolidone-vinyl propanoate random copolymer (molar fraction of vinyl propanoate units 40% and weight average molecular weight 68,000), the same procedure as in Example 1 was carried out to provide a hollow fiber membrane module 9.

Comparative Example 2

First, 16 parts by weight of polysulfone (Udel (registered trademark) P-3500, manufactured by SOLVAY), 4 parts by weight of polyvinylpyrrolidone (Povidon (PLASDONE) K29/K32, manufactured by ASHLAND LCC), and 2 parts by weight of polyvinylpyrrolidone (Povidon (PLASDONE) K90, manufactured by ASHLAND LCC) were added to a solution containing 77 parts by weight of N,N-dimethylacetamide and 1 part by weight of water and dissolved by heating at 90° C. for 14 hours to prepare a spinning dope solution. This spinning dope solution was discharged from an orifice type double tube spinneret adjusted to 40° C. while at the same time, a solution containing 64 parts by weight of N,N-dimethylacetamide and 36 parts by weight of water was discharged from the inner tube as an injection liquid, and the discharged liquids were allowed to pass through a dry section with a length of 350 mm and introduced into a coagulation bath containing water at 40° C. to provide a hollow fiber membrane of an asymmetric structure having a dense layer near the inner surface and a coarse layer near the outer surface. The resulting hollow fiber membrane had an inner diameter of 200 μm and a thickness of 40 μm. The dense layer, which contained no observable pore having a pore diameter of 130 nm or more, had a thickness of 0.78 μm.

Ten hollow fiber membranes prepared as above were packed in a case with a diameter of about 5 mm and a length of about 17 cm, and both ends were potted with an epoxy resin based chemical reaction type adhesive (Quick Mender, manufactured by Konishi Co., Ltd.) and cut open to produce a hollow fiber membrane module. The hollow fiber membranes in the resulting module and the inside of the module were washed with distilled water for 30 minutes. Then, an aqueous solution was prepared by dissolving a vinylpyrrolidone-vinyl propanoate random copolymer (molar fraction of vinyl propanoate units 40% and weight average molecular weight 68,000) and ethanol in such a manner that they would have concentrations of 300 ppm and 1,000 ppm, respectively, and 5 mL thereof was passed from inside to outside of the hollow fiber membranes to ensure that the entire membranes would be coated. Then, 25 kGy of γ-ray was applied to provide a hollow fiber membrane module 10.

Comparative Example 3

First, 18 parts by weight of polysulfone (Udel (registered trademark) P-3500, manufactured by SOLVAY) and 9 parts by weight of vinylpyrrolidone-vinyl acetate copolymer (KOLLIDON (registered trademark) VA64, manufactured by BASF) were added to a solution containing 67 parts by weight of N,N-dimethylacetamide and 1 part by weight of water and dissolved by heating at 90° C. for 14 hours to prepare a spinning dope solution. This spinning dope solution was discharged from an orifice type double tube spinneret adjusted to 40° C. while at the same time, a solution containing 72 parts by weight of N,N-dimethylacetamide and 28 parts by weight of water was discharged from the inner tube as an injection liquid, and the discharged liquids were allowed to pass through a dry section with a length of 350 mm and introduced into a coagulation bath containing water at 40° C. to provide a hollow fiber membrane of an asymmetric structure having a dense layer near the inner surface and a coarse layer near the outer surface. The resulting hollow fiber membrane had an inner diameter of 200 μm and a thickness of 41 μm. The dense layer, which contained no observable pore having a pore diameter of 130 nm or more, had a thickness of 3.11 μm.

Ten hollow fiber membranes prepared as above were packed in a case with a diameter of about 5 mm and a length of about 17 cm, and both ends were potted with an epoxy resin based chemical reaction type adhesive (Quick Mender, manufactured by Konishi Co., Ltd.) and cut open to produce a hollow fiber membrane module, followed by applying 25 kGy of γ-ray to provide a hollow fiber membrane module 11.

Major constitutional features and evaluations of results of each Example and Comparative example are given in Table 1.

Comparative Example 4

Except for passing the aqueous solution of a vinylpyrrolidone-vinyl propanoate random copolymer (molar fraction of vinyl propanoate units 40% and weight average molecular weight 68,000) from inside to outside of the hollow fiber membranes, the same procedure as in Example 1 was carried out to provide a hollow fiber membrane module 12.

TABLE 1

| | | Coating polymer | | | | | | | |
|---|---|---|---|---|---|---|---|---|---|
| | | weight molecular weight average | normalized average intensity of ion signal attributed to carboxylic acid minimum/ maximum (coarse layer) | dense layer/ coarse layer | coarse layer | quantity of carbon derived from ester groups in surface of hollow fiber membrane (%) | | Protein permeation speed retention rate $(F_{100\,mL})/$ $(F_{5\,mL}) \times$ 100 (%) | Protein permeation speed retention rate $(F_{200\,mL})/$ $(F_{5\,mL}) \times$ 100 (%) | Protein solution initial permeation speed (mL/m2/ hr/kPa) |
| | structure | | | | | inner surface | outer surface | | | |
| Example 1 | vinylpyrrolidone/ vinyl propanoate random copolymer | 68,000 | 0.18 | 3.04 | 1.37 | 1.6 | 4.0 | 73 | 61 | 630 |

TABLE 1-continued

| | | Coating polymer | | | | | | |
|---|---|---|---|---|---|---|---|---|
| | | weight molecular weight average | normalized average intensity of ion signal attributed to carboxylic acid | | quantity of carbon derived from ester groups in surface of hollow fiber membrane (%) | | Protein permeation speed retention rate ($F_{100\ mL}$)/ ($F_{5\ mL}$) × 100 (%) | Protein permeation speed retention rate ($F_{200\ mL}$)/ ($F_{5\ mL}$) × 100 (%) | Protein solution initial permeation speed (mL/m2/hr/kPa) |
| | structure | | minimum/maximum (coarse layer) | dense layer/coarse layer | coarse layer | inner surface | outer surface | | | |
| Example 2 | vinylpyrrolidone/vinyl propanoate random copolymer | 68,000 | 0.20 | 3.46 | 1.81 | 1.6 | 4.3 | 83 | 80 | 380 |
| Example 3 | vinylpyrrolidone/vinyl acetate random copolymer | 57,500 | 0.23 | 2.27 | 1.32 | 1.4 | 3.8 | 76 | 62 | 3440 |
| Example 4 | vinylpyrrolidone/vinyl pivalate random copolymer | 7,700 | 0.21 | 2.54 | 1.25 | 1.7 | 4.2 | 75 | 61 | 550 |
| Example 5 | vinylpyrrolidone/vinyl hexanoate random copolymer | 2,200 | 0.23 | 2.63 | 1.65 | 1.8 | 4.3 | 78 | 65 | 420 |
| Example 6 | vinylpyrrolidone/vinyl propanoate random copolymer | 100,000 | 0.19 | 3.03 | 1.94 | 1.6 | 4.1 | 85 | 74 | 390 |
| Example 7 | vinylpyrrolidone/vinyl propanoate random copolymer | 68,000 | 0.21 | 2.03 | 0.92 | 1.2 | 3.1 | 53 | 19 | 3950 |
| Example 8 | vinylpyrrolidone/vinyl propanoate random copolymer | 68,000 | 0.17 | 3.67 | 0.58 | 1.5 | 3.8 | 82 | 72 | 650 |
| Comparative example 1 | — | — | nd | nd | nd | — | — | 2 | — | 7140 |
| Comparative example 2 | vinylpyrrolidone/vinyl propanoate random copolymer | 68,000 | 0.09 | 6.18 | 0.25 | 3.1 | 0.7 | 28 | — | 1640 |
| Comparative example 3 | vinylpyrrolidone/vinyl acetate random copolymer | 57,500 | 0.18 | 1.83 | 0.66 | 4.9 | 1.8 | 30 | 12 | 1940 |
| Comparative example 4 | vinylpyrrolidone/vinyl acetate random copolymer | 68,000 | 0.02 | 6.10 | 0.26 | 4.6 | 0.8 | 7 | — | 920 |

EXPLANATION OF NUMERALS

1. The range from which a line profile was extracted

The invention claimed is:

1. A porous separation membrane that has an asymmetric structure with a dense layer located near a first surface and a coarse layer located near a second opposite surface, and that supports a biocompatible polymer, wherein a proportion of carbon atoms (atom count percentage) derived from an ester group by measurement by an X-ray photoelectron spectrometer (XPS) is larger near the second opposite surface than the first surface, and the porous separation membrane meets requirements (1) and (2) given below in a surface analysis of a cross section containing the dense layer and the coarse layer performed by TOF-SIMS:
   (1) a minimum value of normalized intensity of the ion signal attributed to the biocompatible polymer in the coarse layer is 0.15 times or more of a maximum value thereof and
   (2) a normalized average intensity of the ion signal attributed to the biocompatible polymer in the dense layer is 2.0 times or more of a normalized average intensity of the ion signal attributed to the biocompatible polymer in the coarse layer;
   wherein the biocompatible polymer is a polymer containing a monocarboxylic acid vinyl ester unit;
   wherein the polymer containing a monocarboxylic acid vinyl ester is a copolymer including a hydrophobic unit and a hydrophilic unit;
   wherein the hydrophobic unit comprises a monocarboxylic acid vinyl ester unit; and
   wherein the hydrophilic unit is a vinylpyrrolidone unit.

2. The porous separation membrane as set forth in claim 1, wherein the normalized average intensity of the ion signal attributable to the biocompatible polymer in the coarse layer is 0.5 or more.

3. The porous separation membrane as set forth in claim 1, wherein the ion signal attributed to the biocompatible polymer is an ion signal attributed to carboxylic acid.

4. The porous separation membrane as set forth in claim 1, wherein the polymer containing the monocarboxylic acid vinyl ester unit has a weight average molecular weight of 1,000 or more and 1,000,000 or less.

5. The porous separation membrane as set forth in claim 1 that is in the form of a hollow fiber membrane having inner and outer surfaces.

6. The porous separation membrane as set forth in claim 5, wherein the dense layer forms the inner surface layer.

7. The porous separation membrane as set forth in claim 1, wherein the biocompatible polymer is formed from at least one polymer selected from the group consisting of 2-methacryloyloxyethyl phosphorylcholine (MPC) and 2-methoxyethyl acrylate (PMEA).

8. The porous separation membrane as set forth in claim 1, wherein the biocompatible polymer is formed from at least one polymer selected from the group consisting of polyethylene glycol, polyethylene imine, polyvinyl alcohol, and polyvinylpyrrolidone.

9. The porous separation membrane as set forth in claim 1, wherein pores in the dense layer have a smaller pore diameter than the pores of the coarse layer, and the pore diameter near the first surface is smaller than the pore diameter near the second opposite surface; and wherein the proportion of carbon atoms (atom count percentage) derived from the ester group is larger near the second opposite surface with the larger pore diameter than near the first surface with the smaller pore diameter.

* * * * *